United States Patent Office 2,733,237
Patented Jan. 31, 1956

2,733,237
HETEROCYCLIC ACID HYDRAZONES OF CARBOHYDRATES

Harry Louis Yale and Jack Bernstein, New Brunswick, N. J., assignors to Olin Mathieson Chemical Corporation, New York, N. Y., a corporation of Virginia No Drawing. Application May 28, 1952,
Serial No. 290,576

7 Claims. (Cl. 260—211)

This invention relates to antimycobacterial, especially antituberculous, agents.

It is an object of this invention to provide relatively nontoxic antimycobacterial, especially antituberculous, agents (and methods of preparing them) useful environmentally. The agents of this invention may be used as environmental antimycobacterial agents, especially in hospitals and dairies. Thus, they may be dissolved in a suitable solvent and used as spray compositions, or dissolved in compatible detergent solutions and used for cleansing.

The antimycobacterial agents of this invention comprise O- or S-heterocyclic carboxylic acid hydrazones of hydrazone-forming carbohydrates. Preferred are the furoic and thiophenecarboxylic acid hydrazones (especially the 2-furoic and 2-thiophenecarboxylic acid hydrazones) of hydrazone-forming carbohydrates.

The hydrazones of this invention may be prepared by reacting an O- or S-heterocyclic carboxylic acid hydrazide with the appropriate hydrazone-forming carbohydrate. Thus, the hydrazide reactant may be that of any O- or S-heterocyclic acid, such as 2-furoic, 3-furoic, 2-thiophenecarboxylic, 3-thiophenecarboxylic, 2-thiazolecarboxylic, 4-thiazolecarboxylic, 5-thiazolecarboxylic, 4-thiazolidinecarboxylic, 4-oxazolecarboxylic, 4-oxazolidinecarboxylic, 2-benzofurancarboxylic, 2-thionapthenecarboxylic, 1,2 - pyran - 2 - carboxylic, tetrahydropyran-3-carboxylic and dehydromucic; also substituted derivatives thereof, such as 5-amyl-2-thiophenecarboxylic, 3-methyl-2-furoic, 2,5-dimethyltetrahydro-2-furoic and 2-methyl-3-furoic. The hydrazides of these acids may be prepared by known methods [e.g. Meyer and Mally, Monatchefte, 33: 400 (1912)].

The preferred carbohydrate reactant is a monosaccharide hexose, which may be an aldose, such as glucose, mannose, and galactose, or a ketose, such as fructose. Especially preferred is the aldohexose, glucose. The pentoses, such as arabinose and xylose, and the disaccharides, such as sucrose, maltose and lactose may also be used.

Wide latitude is permissible with respect to reaction conditions. Thus, in preparing the hydrazones, the proportions of reactants used may be altered as desired; and although water is preferred as the reaction medium, other solvents, such as the lower alkanols, dioxane, the cellosolves (2-ethoxy-, 2-benzyloxy-, 2-butoxy- or 2-methoxyethanol, inter alia) and dimethylformamide, may be used.

The corresponding N-heterocyclic-acyl-N'-substituted hydrazines may be obtained by reduction of the hydrazones of this invention, which reduction is preferably effected by treatment with hydrogen in the presence of a catalyst, such as platinum dioxide or palladium on charcoal, until the required amount of hydrogen has been absorbed. The reduction may also be effected by treatment with nascent hydrogen provided by sodium in liquid ammonia, sodium amalgam, zinc-copper couple, etc.; or electrolytic reduction may be used. More complete hydrogenation would not only result in saturation of the C=N but could also transform the heterocyclic nucleus (if unsaturated) to hydrogenated forms thereof (e. g. furane to tetrahydrofurane). As a medium for the reduction treatment, one may use, inter alia, a lower alkanol (e. g. methanol, ethanol and isopropanol), water, acetic acid, dioxane and cyclohexanol.

In synthesis of the N-heterocyclic-acyl-N'-substituted hydrazines, one may prepare and isolate the hydrazone and then hydrogenate to obtain the desired hydrazine; or one may carry out the hydrazone formation and hydrogenation thereof in a single step, or in the same reaction medium.

Following are specific working examples illustrative of the manner in which the hydrazones of this invention may be prepared:

EXAMPLE 1

Glucose 2-furoylhydrazone

To a solution of 36 g. glucose in 20 ml. warm water, there is added 400 ml. warm absolute ethanol and 25.2 g. 2-furoic acid hydrazide. The resulting solution is refluxed for 8 hours, then cooled and allowed to remain at room temperature for 12–16 hours to insure complete reaction. On scratching the walls of the flask, about 26 g. crude crystalline hydrazone (M. P. 173–174° C.dec.) separates and is collected by filtration. On recrystallization from methanol (25 ml./g. crude), a purified product (M. P. 174–175° C.dec.) is obtained having the formula

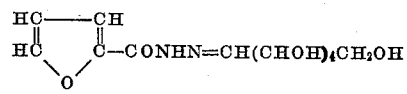

EXAMPLE 2

Glucose 2-thiophenecarboxylic acid hydrazone

To a solution of 9 g. glucose in 25 ml. boiling water is added 500 ml. absolute ethanol and 7.1 g. 2-thiophenecarboxylic acid hydrazide. The resulting solution is refluxed for 8 hours. The reaction mixture is then cooled and the crude hydrazone, which precipitates, is collected by filtration. On recrystallization from 700 ml. boiling methanol, a purified product (M. P. 190–192° C.) is obtained having the formula

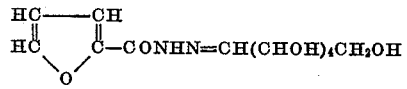

Using stoichiometric amounts of other O- or S-heterocyclic carboxylic acid hydrazides and/or other hydrazone-forming carbohydrates and substantially the same reaction conditions as in these illustrative examples, other O- or S-heterocyclic carboxylic acid hydrazones may be prepared.

This invention may be variously otherwise embodied within the scope of the appended claims.

We claim:

1. A member of the group consisting of the 2-furoic acid and 2-thiophenecarboxylic acid hydrazones of a hydrazone-forming carbohydrate containing not more than 12 carbon atoms.

2. A 2-furoic acid hydrazone of a hydrazone-forming carbohydrate containing not more than 12 carbon atoms.

3. A 2-thiophenecarboxylic acid hydrazone of a hydrazone-forming carbohydrate containing not more than 12 carbon atoms.

4. The product of claim 2 wherein the hydrazone-forming carbohydrate is a hexose.

5. The product of claim 3 wherein the hydrazone-forming carbohydrate is a hexose.

6. Glucose 2-thiophenecarboxylic acid hydrazone.

7. Glucose 2-furoic acid hydrazone.

References Cited in the file of this patent

UNITED STATES PATENTS 2,355,911   Graenacher et al. _____ Aug. 15, 1944
2,685,580   Fox _____ Aug. 3, 1954